United States Patent [19]

Grimm et al.

[11] Patent Number: 4,758,545

[45] Date of Patent: Jul. 19, 1988

[54] PROCESS FOR THE MANUFACTURE OF CATALYST MOLDINGS FROM GRANULAR CATALYST MATERIAL SUCH AS IRON ORE OR CHROMIUM ORE WITH THE USE OF A BINDER

[75] Inventors: Daniel Grimm, Schlangenbad-Bärstadt; Hartmut Kainer; Blagoje Levkov, both of Wiesbaden, all of Fed. Rep. of Germany

[73] Assignee: Didier-Werke AG, Wiesbaden, Fed. Rep. of Germany

[21] Appl. No.: 938,518

[22] Filed: Dec. 5, 1986

[30] Foreign Application Priority Data

Dec. 19, 1985 [DE] Fed. Rep. of Germany ....... 3544913

[51] Int. Cl.$^4$ ...................... B01J 27/18; B01J 27/053; B01J 23/74; B01J 23/26
[52] U.S. Cl. ..................... 502/210; 264/63; 423/239; 502/213; 502/217; 502/218; 502/316; 502/319; 502/338
[58] Field of Search ............... 502/503, 527, 210, 213, 502/217, 316, 338, 218; 423/239 R, 239 A, 213.5; 264/63

[56] References Cited

U.S. PATENT DOCUMENTS

| | | | |
|---|---|---|---|
| 948,947 | 2/1910 | Wrampelmeier | 502/338 |
| 3,214,388 | 10/1965 | Calvert | 502/213 |
| 4,049,777 | 9/1977 | Divivier et al. | 423/239 A |
| 4,138,368 | 2/1979 | Kiyomiya et al. | 502/316 |
| 4,140,749 | 2/1979 | Baresel et al. | 423/213.5 |

FOREIGN PATENT DOCUMENTS

| | | | |
|---|---|---|---|
| 52-72389 | 6/1977 | Japan | 502/316 |
| 1086221 | 10/1967 | United Kingdom | 502/316 |
| 2079172 | 1/1982 | United Kingdom | 502/527 |

Primary Examiner—Paul E. Konopka
Attorney, Agent, or Firm—Nils H. Ljungman

[57] ABSTRACT

A process for the manufacture of catalyst moldings from granular catalyst material, preferably iron ore, chromium ore or a similar ore, with the use of a binder is disclosed. The granular catalyst material is thermally pre-treated in a temperature range of approximately 250° to 1000° C., before it is mixed with dilute and/or concentrated sulfuric acid functioning as the binder.

9 Claims, No Drawings

PROCESS FOR THE MANUFACTURE OF CATALYST MOLDINGS FROM GRANULAR CATALYST MATERIAL SUCH AS IRON ORE OR CHROMIUM ORE WITH THE USE OF A BINDER

CROSS REFERENCE TO CO-PENDING APPLICATIONS

Co-pending application Ser. No. 06/768,417, filed on Aug. 22, 1985, entitled "Method and Apparatus for the Reactivation of a Catalyst", which has issued into U.S. Pat. No. 4,656,148 corresponding to Federal Republic of Germany Patent Application No. P 34 30 887.3, filed on Aug. 22, 1984; co-pending application Ser. No. 06/768,418, filed on Aug. 22, 1985, entitled "Process for Cleaning an Exhaust Gas", corresponding to Federal Republic of Germany Patent Application No. P 34 30 879,9, filed on Aug. 22, 1984; co-pending application Ser. No. 06/768,508, filed on Aug. 22, 1985, entitled "Catalyst for Removal of Nitrogen Oxides from Exhaust Gases", which has issued into U.S. Pat. No. 4,672,052 corresponding to Federal Republic of Germany Patent Application No. P 34 30 886.5, filed on Aug. 22, 1984; co-pending application Ser. No. 06/831,142, filed on Feb. 19, 1986, entitled "Catalyst for the Selective Reduction of Nitrogen Oxides in Waste Gases and Process for the Manufacture and Use of Such a Catalyst", corresponding to Federal Republic of Germany Patent Application No. P 35 05 648.7, filed on Feb. 19, 1985; co-pending application Ser. No. 06/860,306, filed on May 6, 1986, entitled "Process for the Removal of Nitrogen Oxides and Soot from Exhaust Gases of Machines and Combustion Installations Burning Heavy Fuel Oil", corresponding to Federal Republic of Germany Patent Application No. P 35 16 359.3, filed on May 7, 1985; co-pending application Ser. No. 06/887,366, filed on July 17, 1986, entitled "Process for the Production of Catalysts for the Reduction of Nitrogen Oxides from Exhaust Gas and Similar Chemical Air Cleaning Processes", corresponding to Federal Republic of Germany Patent Application No. P 35 26 383.0, filed on July 24, 1985; co-pending application Ser. No. 06/900,824, filed on Aug. 27, 1986, entitled "Catalyst for the Separation of Nitrogen Oxides from Combustion Exhaust Gases", corresponding to Federal Republic of Germany Patent Application No. P 35 30 544.4, filed on Aug. 27, 1985; co-pending application Ser. No. 06/905,752, filed on Sept. 9, 1986, entitled "Process for the Manufacture of Catalyst Molding", corresponding to Federal Republic of Germany Patent Application No. P 35 32 207.1, filed on Sept. 10, 1986; co-pending application Ser. No. 06/938,525, filed on Dec. 5, 1986, entitled "Process for the Manufacture of a Catalyst for the Reduction of Nitrogen Oxides in Exhaust Gases", corresponding to Federal Republic of Germany Patent Application No. P 35 43 858.4, filed on Dec. 12, 1985, all the above applications have at least one of its inventors thereof as an inventor of the present invention. Moreover, all the above-cited applications are assigned to the assignee of the present application. All the co-pending applications are incorporated herein by reference as if set forth in their entirety herein.

BACKGROUND OF THE INVENTION

1. Field of the Invention:

The invention relates to a process for the manufacture of catalyst moldings of granular catalyst material, preferably iron ore, chromium ore, or a similar ore, with the use of a binder.

2. Description of the Prior Art:

$H_2SO_4$ has been found to be useful as a binding agent for catalyst moldings. However, one disadvantage of $H_2SO_4$ is that the moldings tend toward hygroscopicity when exposed to the air. The catalyst moldings thereby become soft. Therefore, the use of $H_2SO_4$ is avoided as far as possible. Examples of prior art are German Patent No. DE-PS 25 12 410 which corresponds to U.S. Pat. No. 4,087,250, entitled "Apparatus for Removing Nitric Oxides from Processing Exhaust Gases", U.S. Pat. No. 4,081,511, entitled "Process for Removing Nitric Oxides from Processing Exhaust Gases", and German Laid Open Patent Application No. DE-OS 25 12 409, all of which are incorporated by reference as if fully set forth herein.

OBJECT OF THE INVENTION

The object of the present invention is a process for the manufacture of catalyst moldings, in which $H_2SO_4$ can be used as a binder.

SUMMARY OF THE INVENTION

This object is achieved by the invention, in that a granular catalyst material is thermally pre-treated in a temperature range of approximately 250° to 1000° C., before it is mixed with preferably dilute $H_2SO_4$ as a binder.

One aspect of the invention relates generally to a process for manufacture of catalyst moldings from a catalyst material comprising granular metal ore catalyst material. The process comprises the steps of: (a) heating the granular catalyst material initially to a temperature in a range from about 250° C. to about 1000° C.; (b) mixing the granular catalyst material subsequent to the heating in step (a) with a binder having a component comprising $H_2SO_4$; and (c) molding and pressing catalyst moldings from the catalyst material formed in step (b).

Another aspect of the invention relates generally to a process for manufacture of catalyst moldings from a granular metal ore catalyst material. The process comprises the steps of: (a) heating the granular catalyst material initially to a temperature in a range from about 250° C. to about 1000° C.; (b) mixing the granular catalyst material subsequent to the heating in step (a) with a binder having sulfuric acid as a component thereof; and (c) molding and pressing catalyst moldings from the catalyst material formed in step (b), the pressing being performed at a pressure of between 10 and 100 Newtons per square millimeter ($N/mm^2$).

DESCRIPTION OF THE PREFERRED EMBODIMENTS

In a preferred embodiment of the invention, the granular catalyst material is thermally pre-treated in a temperature range of approximately 250° to 1000° C., before it is mixed with preferably dilute $H_2SO_4$ as a binder.

It has been found that catalyst moldings produced by means of such a process are no longer subject to the usual softening resulting from the hygroscopicity of the $H_2SO_4$, or at least the tendency to hygroscopicity is significantly reduced. Such a property may be due to the fact that the thermal pre-treatment of the catalyst material creates a higher initial porosity.

An additional improvement of the hardening of the catalyst moldings can be achieved if the thermal pre-treatment is carried out in a steam, $CO_2$ and/or $SO_2/SO_3$, atmosphere, either at normal pressure such as atmospheric pressure or at increased pressures over atmospheric.

By exposing the granular material mixed with the binder to an increased temperature in an air atmosphere, the effectiveness of the catalyst molding can be further improved by open reactive contact surfaces. This tempering is conducted at a temperature between approximately 350° and 750° C. or between 350° and 700° C., preferably at approximately 450° C., for at least three hours and preferably for approximately five hours in a gaseous atmosphere chosen from the group comprising air, an exhaust gas, an oxidizing atmosphere, a reducing atmosphere, $NH_3$, $CO$, $CH_4$ and $H_2$.

The granular material mixed with the binder or the catalyst moldings can be exposed under an increased temperature above ambient room temperature and an increased pressure about ambient atmospheric pressure to a stream and/or $SO_2/SO_3$ atmosphere, thereby achieving a rehardening of the catalyst moldings. Typical pressures are from somewhat above atmospheric pressure to a few atmospheres. Surprisingly, it was found that this effect of rehardening is signifcantly increased if this rehardening is conducted in a reducing atmosphere, by exposing the granular material mixed with the binder or the catalyst moldings to a $CO$ and/or $NH_3$ atmosphere at increased temperature above ambient room temperature and preferably in the same range and time as the initial tempering of 350° to 750° C., preferably at approximately 450° C., for at least three hours and preferably for approximately five hours. This can be done exclusively or also in connection with the rehardening in a stream atmosphere and/or an $SO_2/SO_3$ atmosphere. This rehardening can also be performed during use, by exposing the catalyst moldings in the reactor to an exhaust gas current containing $SO_2$, $SO_3$, and $H_2O$. The resistance of the catalyst moldings to moisture is also improved by this process.

If tempering is conducted once again after the steam treatment, the strength of the catalyst moldings can be further increased.

Another characteristic of the invention comprises adding metal oxide and/or appropriate metal hydroxides, preferably $MgO$, $Mg(OH)_2$, $Cr_2O_3$, $Al_2O_3$, $Al(OH)_3$, $TiO_2$, $CaO$, $Ca(OH)_2$, $BaO$, $Ba(OH)_2$, $SrO$, $Sr(OH)_2$, $CuO$, $WO_3$ and/or $V_2O_5$ or natural oxide mixtures, preferably alumina, fire clay, chromium ore, magnesite, dolomite, or bauxite to the granular catalyst material. A bond with $SO_2$ which increases strength can thereby be created.

It has also been shown that small quantities of a phosphate compound have the effect of increasing strength. With such an acid mixture of $H_2SO_4$ and preferably $H_3PO_4$ or $Na(PO_3)_n$, $H_2SO_4$ essentially furthers the activity of the catalyst material, and the phosphate compound essentially increases the strength properties of the catalyst moldings. The phosphate compounds may comprise up to about 10% of the binder and preferably up to 10 percent $P_2O_5$.

It is also advantageous if the binder also contains sulfate. The activity of the catalyst can thereby be further increased.

The strength of the catalyst material is particularly good if a granular material in the grain size range of less than 2 mm is used.

To improve the bending strength and flexibility of the catalyst moldings, an embodiment of the invention also proposes that fibers be interspersed in the granular material.

The catalyst moldings made according to an embodiment of the invention can be appropriately produced by molding the mixture of the granular material and the binder, and the fibers, if any, at a pressure between approximately 10 and $100 N/mm^2$.

It was also found that free $H_2SO_4$ can be bonded by spraying or saturating the catalyst moldings with a chloride such as $BaCl_2$, $SrCl_2$, $CaCl_2$, $CuCl_2$, or similar reagents. The process described by the invention is explained in greater detail below on the basis of several embodiments:

EXAMPLE 1

A basic mixture is produced, comprising 90% iron ore with a grain size of 0 to 0.5 mm and 10% iron ore 6300 Blaines ($cm^2/g$) and 35 ml of a 50% concentration of $H_2SO_4$ per kg of the basic mixture. The ore was pre-tempered for five hours at 450° C. After a tempering of the plates which are 4.7 to 4.8 mm thick which are produced from the basic mixture under a molding pressure of $50 N/mm^2$, measurements showed a water absorption of 0.70 wt. %, a cold bending strength dry of $6.1 N/mm^2$, and a cold bending strength wet (after storage in a climate-controlled container at 30° C. and 95% relative humidity for six hours) of $3.4 N/mm^2$.

EXAMPLE 2

After a pretempering of a basic mixture of 90% iron ore with a grain size of 0 to 0.5 mm and 10% iron ore 6300 Blaine ($cm^2/g$) (ground for four hours) for five hours at 450° C., a mixture was produced with 35 ml $H_2SO_4$ at an 80% concentration per kg basic mixture. The catalyst plates produced under the conditions described in Example 1 were rehardened at 450° C. for five hours. The raw density of the tempered plates was approximately 3.25 $g/cm^3$. Measurements showed a water absorption of 1.94 wt. %, a cold bending stregnth dry of $7.8 N/mm^2$ and a cold bending strength wet (under the conditions described in Example 1) of $<3.0 N/mm^2$.

Tests regarding the tempering time of the catalyst moldings showed that more than five hours of tempering at approximately 450° C. produced no significant change in the water absorption and the bending strength.

EXAMPLE 3

A basic mixture was produced from iron ore (25; % fines, 30% <0.09 mm, 25% 0.09 to 2 mm and 20% 0.2 to 0.3 mm grain size) and 35 ml per kg dry weight with a concentration 75% $H_2SO_4$ of the basic mixtures and 35 ml per kg dry weight with a 70% concentration of $H_3PO_4$ mixture in the ratio 2/3:1/3. Catalyst plates were then manufactured from this mixture in the same manner as from mixtures without $H_3PO_4$. A comparison of the bending strengths of the two plates showed a clear positive influence of the $H_3PO_4$ binder.

EXAMPLE 4

A basic mixture of iron ore and chromium ore (40% iron ore 0.2–0.5 mm, 40% iron ore 0–0.2 mm, 20% chromium ore fines having (6300 Blaine)(as defined above)) and 35 ml/kg dry weight with a concentration of 75% $H_2SO_4$ was produced. The ore mixture was exposed to a tempering at 400° C. for 8 hours. After a tempering of the plates molded from the basic mixture at 50N/mm², these plates exhibited a higher strength and a lower water absorption than plates without chromium ore.

EXAMPLE 5

A basic mixture of chromium ore (30% chromium ore 0.5–1.00 mm, 26% chromium ore 0.2–0.5 mm, 24% chromium ore 0–0.2 mm, 20% chromium ore fines (6300 Blaine)) with 35 milliliters per kilogram (ml/kg) dry weight with a 75% concentration of $H_2SO_4$ was produced. The ore was subjected to a tempering at 400° C. for eight hours. After a tempering of the plates molded from the basic mixture at 50N/mm², these plates exhibited a higher strength and a lower water absorption than plates of iron ore.

What is claimed is:

1. A process for the manufacture of catalyst moldings by molding granular material, with the selective use of sulfuric acid as a binder containing up to 10% $P_2O_5$, said process comprising the steps of:
   (a) selecting said granular material comprising a member of the group consisting of iron ore and chrome ore and a combination thereof having a grain size of less than 2 mm;
   (b) heating said granular catalyst material initially to a temperature in a range from about 250° C. to about 1000° C. in an atmosphere containing steam and at least one member of the group consisting of $CO_2$, $SO_2$ and $SO_3$ to increase the hardness of the moldings;
   (c) mixing said granular material subsequent to said heating in step (b) with a binder selected from the group comprising dilute $H_2SO_4$ and concentrated $H_2SO_4$, said binder also containing up to 10% $P_2O_5$ to effectively increase the strength of the moldings; and
   (d) molding and pressing catalyst moldings from the catalyst material formed in step (c) at a pressure between 10 and 100N/mm².

2. The process according to claim 1 including tempering at about 350° C. to about 700° C. for at least three hours, of said granular material mixed with said binder from step (c).

3. The process according to claim 2 wherein said temperature of tempering is approximately 450° C.

4. The process according to claim 1 wherein said granular material, after being mixed with said binder from step (c), is flushed with an atmosphere having a component chosen from a member of the group consisting of CO and $NH_3$, at a temperature of about 350° C. to about 750° C. for at least three hours.

5. The process according to claim 4 wherein the material is tempered after being exposed to said atmosphere.

6. The process according to claim 1 wherein said granular material mixed with a binder in step (c) is exposed to an atmosphere having a component chosen from a member of the group consisting of steam, $SO_2$, $SO_3$, and combinations, thereof.

7. The process according to claim 6 wherein the material after being exposed to said atmosphere is tempered at about 350° C. to about 700° C. for at least three hours.

8. The process according to claim 1 wherein said moldings are treated with a component chosen from a member of the group consisting of BaCl, SrCl, CaCl, and CuCl.

9. The process according to claim 8 wherein said treating the said catalyst moldings comprises spraying with a component chosen from a member of the group consisting of BaCl, SrCl, CaCl, and CuCl.

* * * * *